(12) United States Patent
Lee (10) Patent No.: US 6,236,471 B1
(45) Date of Patent: May 22, 2001

(54) VERTICAL ALIGNMENT CORRECTION APPARATUS AND METHOD

(75) Inventor: Hyun-Jun Lee, Kyungki-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/086,981

(22) Filed: May 29, 1998

(30) Foreign Application Priority Data

May 29, 1997 (KR) .................................................. 97-21520

(51) Int. Cl.[7] .................................................. H04N 1/04
(52) U.S. Cl. .......................................... 358/474; 358/408
(58) Field of Search ................................... 358/408, 405, 358/407, 410, 443, 442, 468, 473, 474

(56) References Cited

U.S. PATENT DOCUMENTS

| | | | |
|---|---|---|---|
| 5,111,514 | * 5/1992 | Ohta | 382/9 |
| 5,250,956 | * 10/1993 | Haselby et al. | 346/1.1 |
| 5,335,290 | * 8/1994 | Cullen et al. | 382/9 |
| 5,778,103 | * 7/1998 | Allen et al. | 382/254 |
| 5,854,853 | * 12/1998 | Wang | 382/176 |
| 5,995,717 | * 11/1999 | Tanaka | 395/109 |

\* cited by examiner

*Primary Examiner*—Jerome Grant, II
*Assistant Examiner*—Kevin Kianni
(74) *Attorney, Agent, or Firm*—Robert E. Bushnell, Esq.

(57) ABSTRACT

A vertical alignment correction apparatus and method includes a central processing unit for reading a vertical alignment correction program, detecting scanning distances during bidirectional scanning using a vertical reference line, and outputting a control signal for correcting a scanning distance difference; a print driver for receiving the correction control signal and for outputting a control signal for controlling the scanning distances; and a carriage return motor whose rotation number is controlled according to the control signal output from the print driver.

33 Claims, 7 Drawing Sheets

VERTICAL ALIGNMENT CORRECTION APPARATUS AND METHOD

CLAIM OF PRIORITY

This application makes reference to, incorporates the same herein, and claims all benefits accruing under 35 U.S.C. §119 from my applications entitled VERTICAL ALIGNMENT CORRECTION APPARATUS AND METHOD filed in the Korean Industrial Property Office on May 29, 1997 and there duly assigned Serial No. P97-21520 by that Office.

BACKGROUND OF THE INVENTION

1. Technical Field

The present invention relates to a vertical alignment correction apparatus and method and more particularly, to a vertical alignment correction apparatus and method for a bidirectional scanner device.

2. Related Art

Multimedia systems that are driven to present combinations of moving and still pictures, sound, music, and words, are pervasive in the industrialized world, especially in computers or in other entertainment appliances. Concurrent with the development of multimedia computer systems, peripheral equipment including image formation equipment such as printers, have been incrementally modified to provide various functions. A multi-tasking system, employing an ink-jet mechanism and serving as a facsimile and scanner, will typically be coupled to an external personal computer that performs a user-selected program and generates print data. The multi-tasking system typically either receives data from the personal computer or scan data printed on the exposed surface of one or more documents. Conventional multi-tasking systems include a scanner such as a laser flatbed or sheetfed scanner, for reading information existing on a document by scanning the document. With a sheetfed laser scanner, the scanner remains in a fixed state while the document bearing the information is moved in a vertical direction during laser scanning of its exposed surface. With a flatbed laser scanner, a laser beam is swept across a flat plate by the scanner modulated by video signals from a similar reading system or by digital signals generated by a computer.

A conventional scanner is designed to convert images recorded on a document into a computer-compatible electronic form. The images recorded on the document can be scanned as follows. An amount of light is first transmitted to the document from a source. As a result, the image data on the document causes some of that light to be reflected in a particular pattern. The pattern of reflected light is then supplied to a fixed array of light sensors through an intermediate image reduction mirror. The light sensors in the array can be charge-coupled devices (CCD) or contact image sensors (CIS). Then circuitry in the scanner senses the status of each sensing element in the array one by one, in order, to register the brightness of each point in each individual scan line. After the scanner has collected and arranged the data from each sensor, the next line of data can be read. Image data read from a document can be recorded onto a recordable medium. Image data read from a document can be considered as scanned data or scan data.

There are two main categories of conventional scanner devices: the shuttle type and the array type. The array type shall be considered first. The array type of scanner scans the data recorded on the document per a line unit, when a line scanner module having a size similar to, or larger than, the width of the document is fixed at a predetermined position inside of the multifunctional device. The scanner module is typically stationary while the document is transported along a path of conveyance through the scanner device.

The shuttle type of scanner can be described as follows. The shuttle type of scanner typically has a guide axis, a transporting belt, and a driving source for driving the transporting belt, which are all established at the scanning unit, in order to reciprocate the scanner module perpendicular to the document transporting direction. Thus, the scanner module is typically transported back and forth along a first path while the document is transported along a second path through the scanner device, the first and second paths being perpendicular to one another. Some shuttle type scanners are unidirectional and some are bidirectional. Unidirectional shuttle type scanners read image data from a document only while the scanner module is being transported in a first direction along the first path. Bidirectional shuttle type scanners read image data from a document while the scanner module is being transported in a first direction along the first path and also while the scanner module is being transported in a second direction along the first path.

I have found that unidirectional shuttle type scanners often read image data at a slower rate than bidirectional shuttle type scanners. However, image data read by unidirectional scanners typically have fewer alignment problems than do the image data read by bidirectional scanners.

I have discovered that it would be desirable to develop an enhanced bidirectional scanner having improved image data reading capabilities such that speed is increased and alignment problems are reduced.

SUMMARY OF THE INVENTION

Accordingly, it is an objective of the present invention to develop an alignment apparatus and method enabling a scanning device to correct alignment problems when alignment problems arise.

It is another object of the present invention to overcome such drawbacks of the related art as described above, and to provide a vertical alignment correction apparatus and method for setting a reference line on a white pad prior to scanning of information written on a document using a scanner device in a multifunctional machine, and scanning the document in two directions, using the vertical reference line, to thereby measure the scanning distances, calculate the difference between the measured distances, and finally correct the scanning distance according to the obtained difference between the distances.

To accomplish the above objectives and others, there is provided a vertical alignment correction apparatus comprising: a central processing unit for reading a vertical alignment correction program stored in a system memory, detecting scanning distances with a carriage return motor's rotation step number, during bidirectional scanning using a vertical reference line, and outputting a control signal for correcting a scanning distance difference if it occurs according to the detection result; a print driver for receiving the correction control signal output by implementing a program for correcting the scanning difference, generated from the central processing unit (CPU), and for outputting a control signal for controlling the scanning distances; and a carriage return motor whose rotation number is controlled according to the control signal output from the print driver.

To accomplish the above objectives and others, there is provided a vertical alignment correction method comprising the steps of: (a) scanning and recognizing a vertical reference line in the first block of a document; (b) scanning in one direction from the vertical reference line when it is recognized in the step (a), and thus obtaining a reference value; (c) scanning in the other direction when the reference value is obtained in the step (b), to count a second motor step number, and (d) comparing the reference value and second motor step number obtained respectively in the steps (b) and (c), and if they are not equal, correcting them so that bidirectional scanning distances become the same.

Also, to accomplish the above objectives and others, there is provided an alignment correction apparatus for a scanner device, comprising: a memory unit storing an alignment correction routine for correcting alignment of image data read from a surface of an original document; an optical reading unit reading the image data from the surface of the original document when said optical reading unit is being transported along a first path of conveyance in a first direction across the surface of the original document, and reading image data from the original document when said optical unit is being transported along a second path of conveyance in a second direction across the surface of the original document, the second direction being opposite to the first direction; a carriage return motor connected to said optical reading unit, performing a first plurality of rotation steps to transport said optical reading unit in the first direction, and performing a second plurality of rotation steps to transport said optical reading unit in the second direction; a control unit connected to said memory unit and said optical reading unit, reading the alignment correction routine from said memory unit, controlling said optical reading unit, detecting said first and second pluralities of rotation steps of said carriage return motor, and outputting an alignment correction signal according to the alignment correction routine; and a motor controller connected to said control unit and said carriage return motor, receiving said alignment correction signal from said control unit, and controlling said first and second pluralities of rotation steps of said carriage return motor according to said alignment correction signal.

In addition, to accomplish the above objectives and others, there is provided an alignment correction method for a scanner device, comprising the steps of: detecting a reference unit located on said scanner device; when said reference unit is detected, transporting an optical reading unit along a first path of conveyance in a first direction across a surface of an original document, and obtaining a first reference value, said optical reading unit being transported by a carriage return motor; when said reference value is obtained, transporting said optical reading unit along a second path of conveyance in a second direction across the surface of the original document, and obtaining a second reference value; and correcting said reference values to correct alignment of the image data read from the original document when said first reference value is not equal to said second reference value.

Additionally, to accomplish the above objectives and others, there is provided an alignment correction apparatus for a scanner device, comprising: a memory unit storing an alignment correction routine for correcting alignment of image data read from a surface of an original document; an optical reading unit reading the image data from the surface of the original document when said optical reading unit is being transported along a first path of conveyance in a first direction across the surface of the original document, and reading image data from the original document when said optical unit is being transported along a second path of conveyance in a second direction across the surface of the original document, the second direction being opposite to the first direction; a carriage return motor connected to said optical reading unit, performing a first plurality of rotation steps to transport said optical reading unit in the first direction, and performing a second plurality of rotation steps to transport said optical reading unit in the second direction; a control unit connected to said memory unit and said optical reading unit, reading the alignment correction routine from said memory unit, controlling said optical reading unit, detecting said first and second pluralities of rotation steps of said carriage return motor, and outputting an alignment correction signal according to the alignment correction routine; a motor controller connected to said control unit and said carriage return motor, receiving said alignment correction signal from said control unit, and controlling said first and second pluralities of rotation steps of said carriage return motor according to said alignment correction signal; a reference unit located at a position adjacent to a first side of the original document, the first path of conveyance having a starting location at said reference unit, and the second path of conveyance having an ending location at said reference unit; and a scan end region located at a position adjacent to a second side of the original document, said second side of the original document being opposite to said first side of the original document, and said image data being disposed between said first and second sides of the original document, the first path of conveyance having an ending location at said scan end region, and the second path of conveyance having a starting location at said scan end region.

The present invention is more specifically described in the following paragraphs by reference to the drawings attached only by way of example.

BRIEF DESCRIPTION OF THE ATTACHED DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE INVENTION

An example of prior art multifunctional machines in combination with printing and scanning functions is explained below referring to the attached drawings. Turn now to the drawings and more particularly to FIG. 1, which illustrates a block diagram of a conventional multifunctional machine having a scanning function. A multifunctional machine 20 with printing/scanning functions receives or outputs data or control signals externally through interface 21. Print data are applied to central processing unit 23 from personal computer 10 through interface 21.

Figure 1:
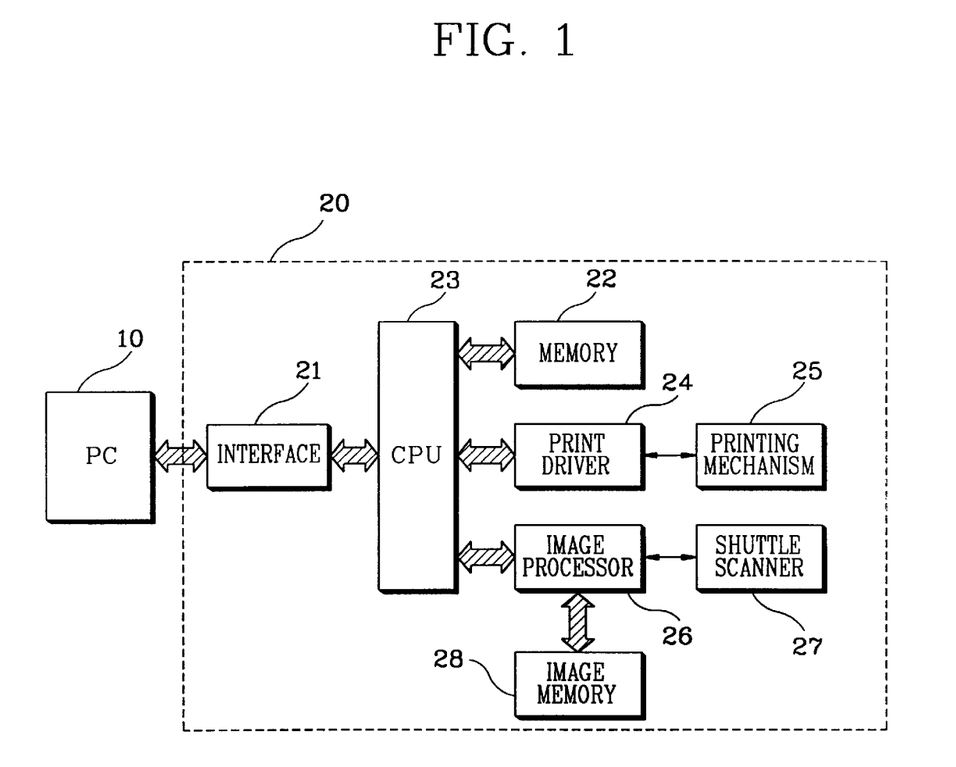
FIG. 1 is a block diagram of a conventional multifunctional machine having a scanning function.

Central processing unit 23 receiving the print data reads a required control program and data from memory 22, outputting a control signal for printing the print data. The output control signal is accepted in print driver 24. Then, print driver 24 controls a printing mechanism according to the control signal applied, for the purpose of printing.

In order to scan an information-containing document, a shuttle type scanner is used. When the document is scanned with the shuttle scanner, the image data scanned is compensated for in image processor 26 and then stored in image memory 28. The image data stored in image memory 28 is transmitted to personal computer 10 through interface 21 under the control of central processing unit 23.

Personal computer 10 receiving the image data via interface 21 processes and stores them through an application, for the purpose of data base. To print the scanning data base, print data are re-produced and transmitted to multifunctional machine 20. According to the print data transmitted, multifunctional machine 20 generates a control signal through central processing unit 23 so that the scanned image data are printed through print driver 24 and printing mechanism 25.

The shuttle scanner mounted on such conventional multifunctional machine scans information written on a document in one direction or two directions. Especially, for a faster scanning speed, the bidirectional scanning is adopted. For A4 size document scanning, it is divided into 27 blocks.

In case of the bidirectional scanning, though there is a faster scanning speed, a difference of scanning distance may be caused because the scanning start point changes with the lapse of time due to the mechanical characteristics. Because of the scanning distance difference, bands, nearby blocks, deviate from each other as much as the difference occurring due to the different scanning directions, causing difference in vertical alignment. In order to overcome such problem, the unidirectional scanning is selected even though its slower scanning speed. This unidirectional scanning decreases the scanning efficiency due to the sluggish scanning speed. On the other hand, the bidirectional scanning reduces the quality of image scanned.

Figure 2:
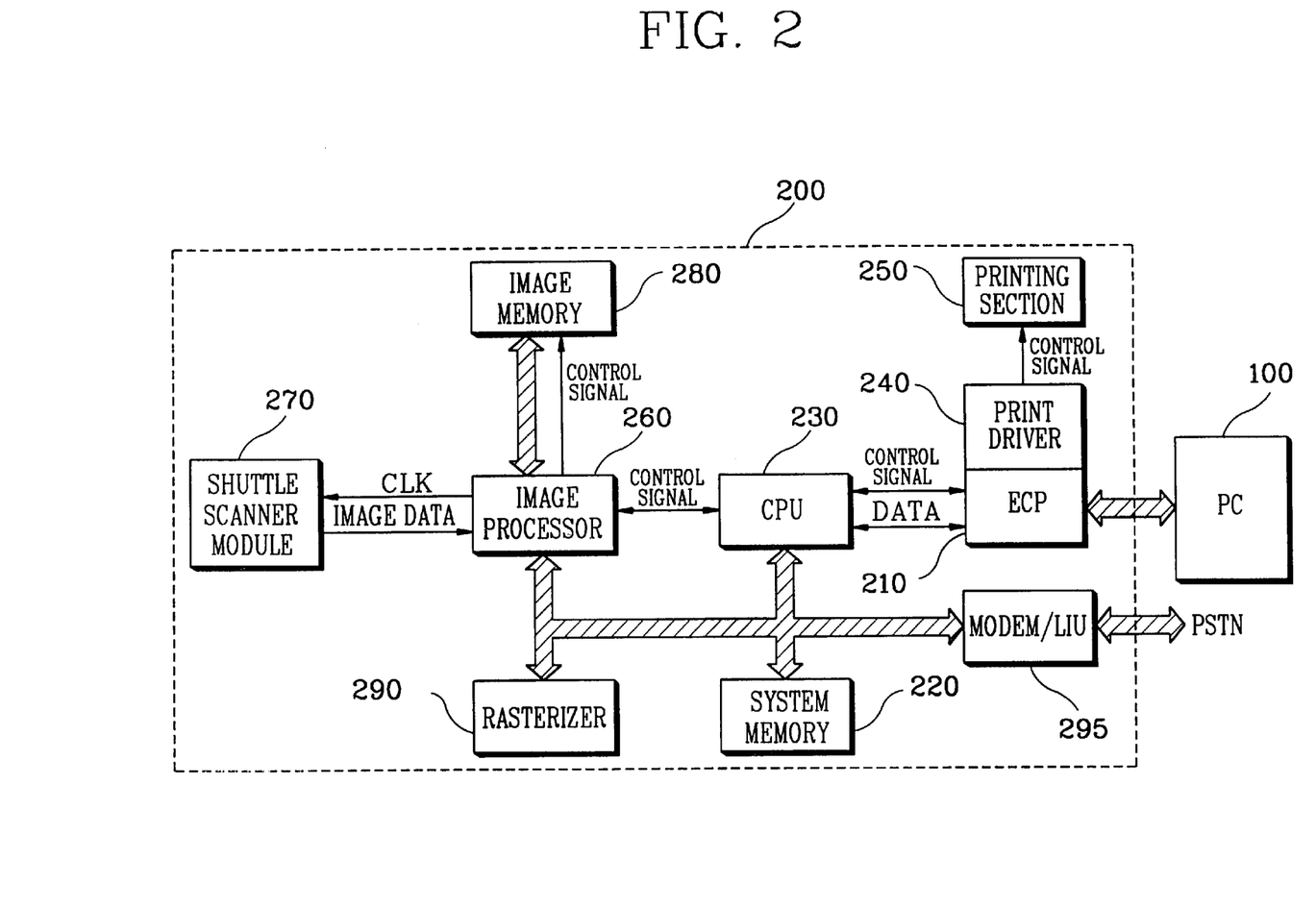
FIG. 2 is a block diagram of a control circuit for controlling the driving mechanism of a multifunctional machine having a scanning function, according to the principles of the present invention.

Hereinafter, a preferred embodiment of the present invention will be described with reference to the attached FIGS. 2, 3, and 4. Referring now to FIG. 2, which illustrates a block diagram of a control circuit for controlling the driving mechanism of a multifunctional machine having a scanning function, according to the principles of the present invention. In FIG. 2, a control circuit of the driving mechanism of the multifunctional machine of the present invention comprises a system memory 220 for storing a control program of multifunctional machine 200 and a program of controlling the initial set condition data and vertical alignment correction, a central processing unit 230 for reading the data and program stored in system memory 220 to control the overall operation of multifunctional machine 200, detecting the scanning distances during bidirectional scanning of information written on document 200a by counting the rotation number of a carriage return motor 250e, and finally outputting a control signal for correcting the difference between the scanning distances if it happens according to the detection result, a print driver 240 for processing a control signal for correction output by implementing print data generated from central processing unit 230 and a program for correcting the scanning distances, and then outputting a control signal for scanning distance, a printing section 250 equipped with a mechanism for controlling line feed motor 250a and carriage return motor 250e according to the control signal output from print driver 240 to carry the document or print medium 200a, or controlling the movement of print head 250c, an image processing section 260 for receiving the scanning control signal output from central processing unit 230, and then outputting a control signal for scanning the information written on document 200a, a shuttle scanner module 270 for scanning the information written on document 200a with the control signal output from image processing section 260, or with the control signal for scanning distance output from print driver 240 to control it, and an image memory 280 for temporarily storing the image data scanned by shuttle scanner module 270 according to the control signal of image processing section 260.

Figure 3:
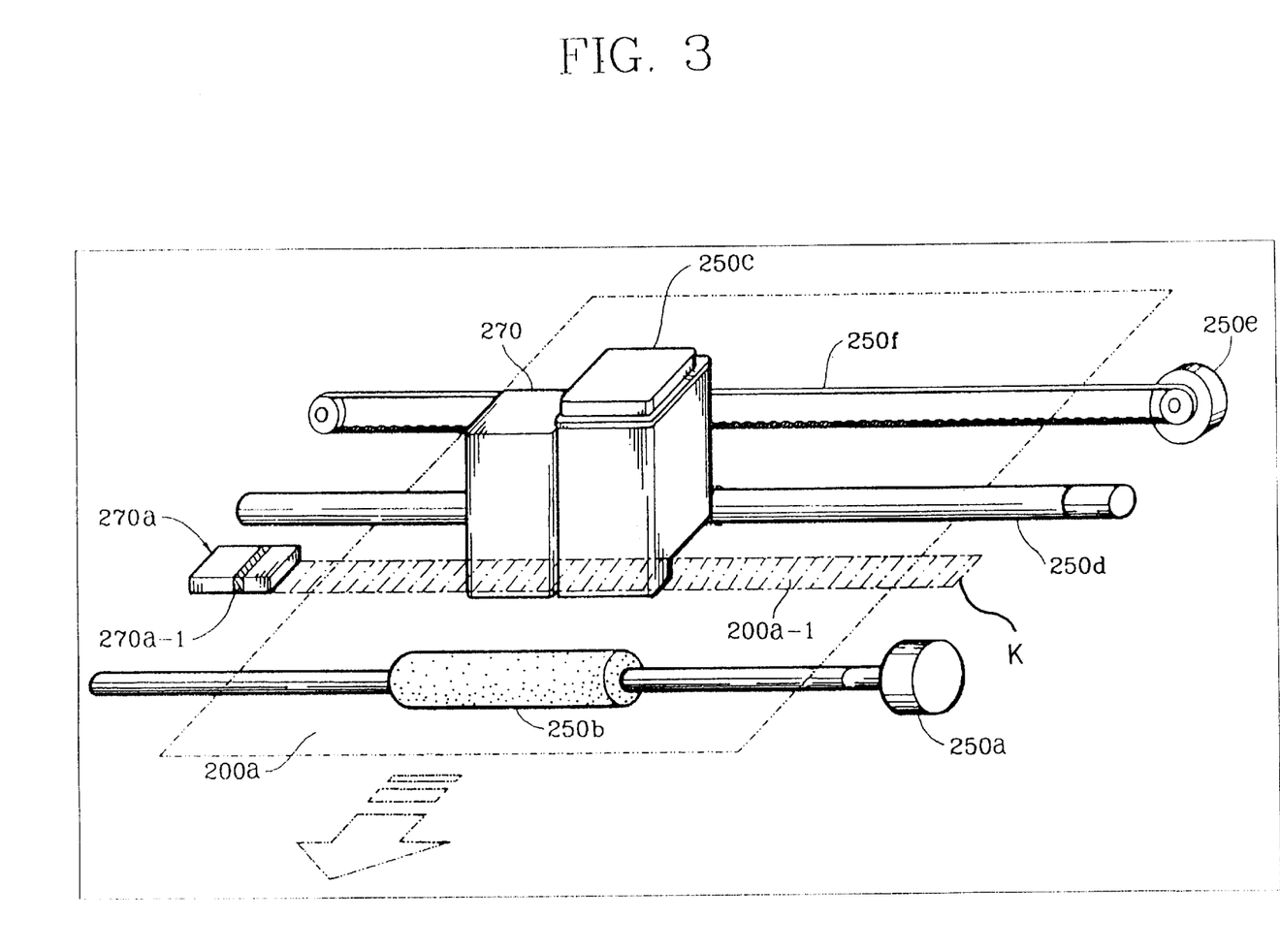
FIG. 3 is a diagram of the driving mechanism of the multifunctional machine of FIG. 2, according to the principles of the present invention.

Turn now to FIG. 3, which illustrates a diagram of the driving mechanism of the multifunctional machine of FIG. 2, according to the principles of the present invention. The driving mechanism of the multifunctional machine controlled by the above-explained control circuit will be described below with reference to FIG. 3. Referring to FIG. 3, the driving mechanism comprises line feed (LF) motor 250a for generating a rotation force for carrying the information-written document and print medium 200a, line feed roller 250b for receiving the rotation force of line feed motor 250a to carry the document and print medium 200a, a print head 250c for spraying ink onto print medium 200a conveyed by line feed roller 250b to form an image, a white pad 270a used for white reference during scanning and forming a vertical reference line 270a-1, a reference of scanning distance during scanning, shuttle scanner module 270 mounted on one side of print head 250c for scanning the information written on document 200a carried by line feed roller 250b at the vertical reference line 270a-1 formed on white pad 270a along scanning path 200a-1, carriage return (CR) motor 250e for providing a rotation force that allows print head 250c and shuttle scanner module 270 to move left and right for the purpose of scanning the document or spraying ink to print medium 200a, time belt 250f for transmitting the rotation force generated from carriage return motor 250e, and guide shaft 250d for guiding print head 250c and shuttle scanner module 270 that move left and right by time belt 250f.

Figure 4A:
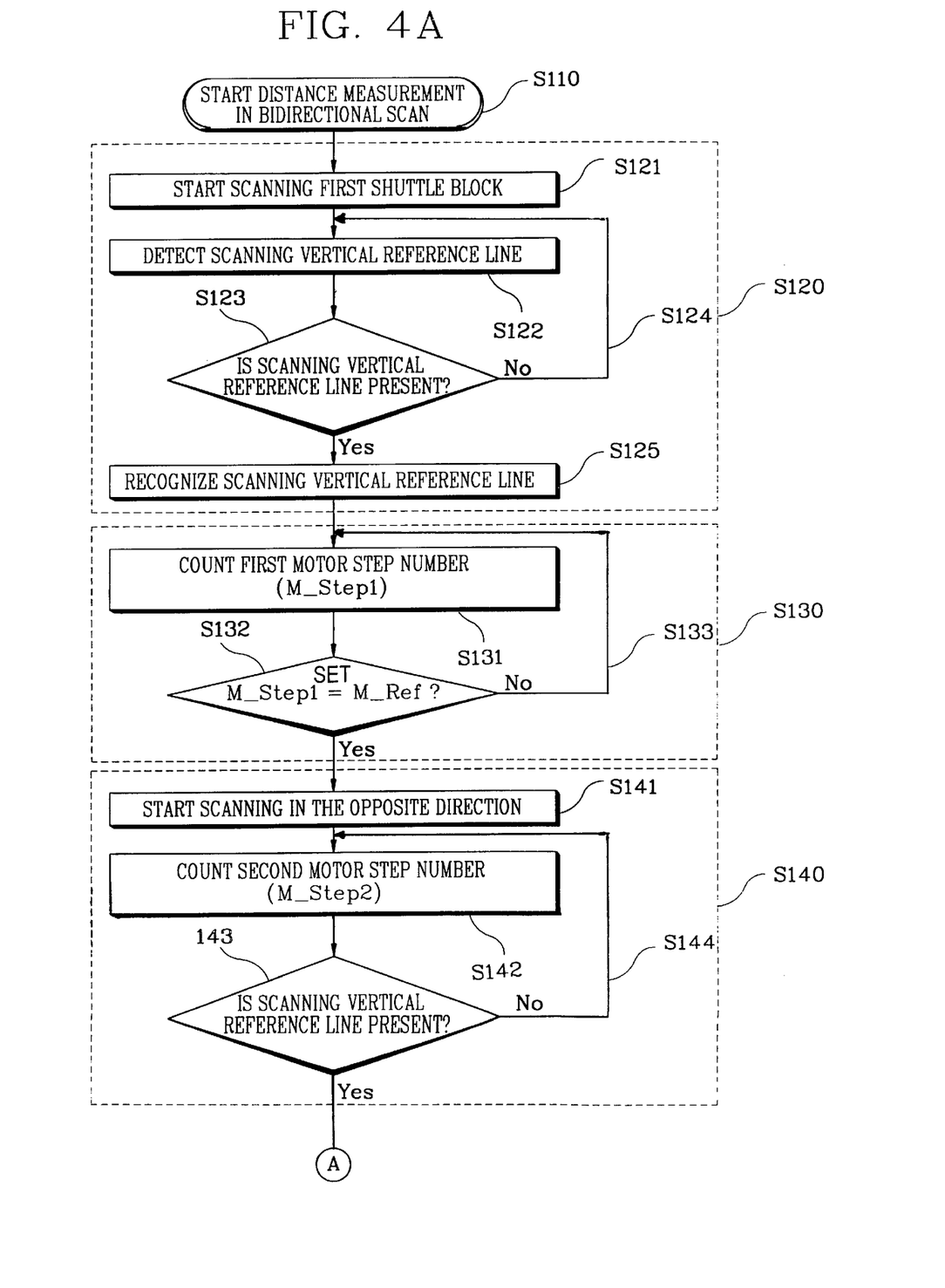
FIGS. 4A and 4B comprise a first section and a second section, respectively, of a flowchart illustrating a vertical alignment correction method, according to the principles of the present invention.
Figure 4B:
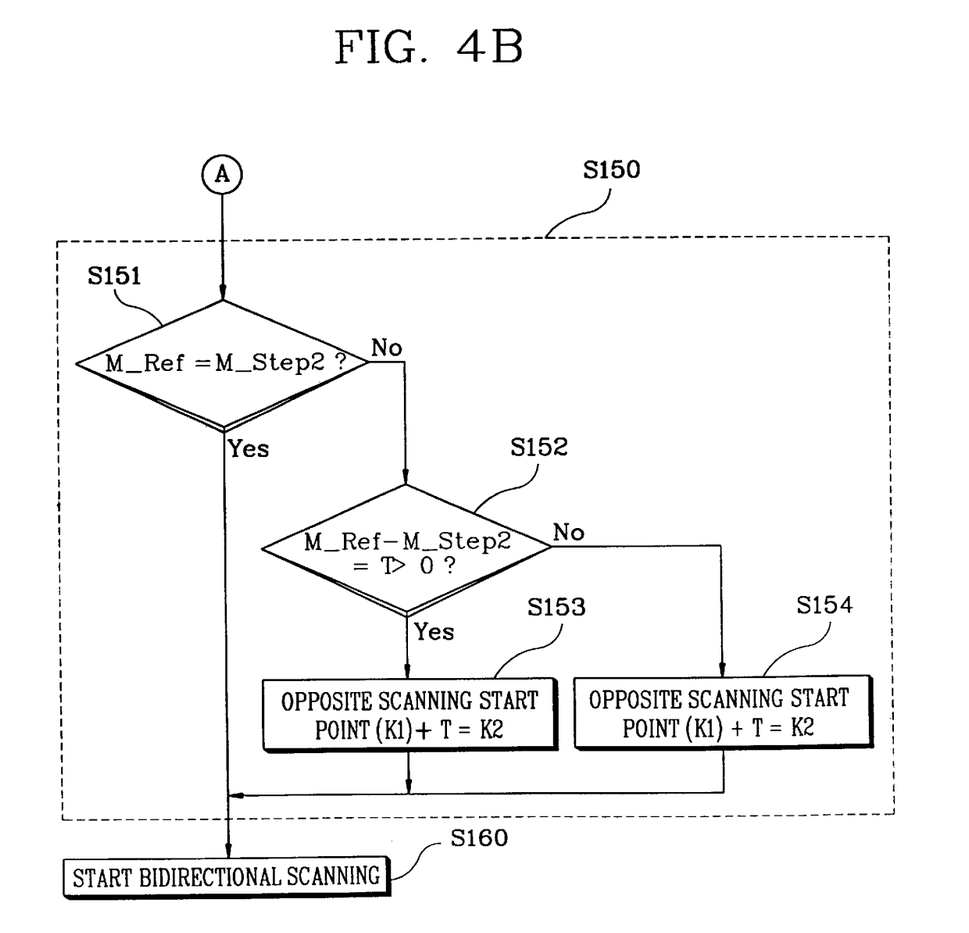

Turn now to FIGS. 4A and 4B, which comprise a first section and a second section, respectively, of a flowchart illustrating a vertical alignment correction method, according to the principles of the present invention. An embodiment of central processing unit 230's vertical alignment correction function of the present invention will be explained below referring to FIG. 4, in which the rotation number of carriage return motor 250e is counted to detect the scanning distances, and if there occurs difference between the scanning distances, a scanning distance correction program is implemented to output a correction control signal.

In FIG. 4A, at step S110, a program is implemented correcting a scanning distance difference during bidirectional scanning through central processing unit 230. At step S120, scanner module 270 scans the first block of document 200a and vertical reference line 270a-1 is recognized when the bidirectional scanning starts in step S110. At step S130, scanner module 270 scans in one direction from vertical reference line 270a-1 toward end K of scanning path 200a-1 when vertical reference line 270a-1 is recognized in step S120, and thus obtains a reference value M_Ref. At step S140, scanner module 270 scans in the other direction when reference value M_Ref is obtained in step S130 and counts the number of motor steps in accordance with the scanning distance to obtain the second motor step number M_Step2. In FIG. 4B, at step S150, the bidirectional scanning distances is corrected when the second motor step number M_Step2 obtained in step S140 is not the same as the reference value M_Ref, so that the distances become equal. At step S160, bidirectional scanning is performed when the distance difference during bidirectional scanning is corrected in step S150. Also, step S160 will be performed if no correction is needed.

In this procedure, the step S120 of scanning and recognizing vertical reference line 270a-1 in the first block of document 200a comprises substeps S121, S122, S123, S124, and S125. At step S212, scanning of the first block of document 200a starts when bidirectional scanning begins in step S110. At step S122, a detection scanning is performed to detect vertical reference line 270a-1 along scanning path 200a-1 of the first block of document 200a when the first block scanning begins in step S121. At step S123, a decision is made as to whether the vertical reference line 270a-1 was found in step S122. At step S124, control is returned to step S122 if the vertical reference line 270a-1 is not detected in step S123, in order to again attempt to find the vertical reference line 270a-1.

The step S130 of calculating a scanning reference value in bidirectional scanning using vertical reference line 270a-1 comprises the substeps of S131, S132, and S133. At step S131, a counting of the first motor step number M_Step1 is performed, starting at vertical reference line 270a-1 and ending at the end K of scanning path 200a-1 in one direction when vertical reference line 270a-1 is found in step S123. At step S132, a decision is made as to whether the end K of scanning path 200a-1 has been reached, and if the end K has been reached, the reference value M_Ref is set to be equal to the motor step number M_Step1 counted in step S131. Note that at step S132, M_Ref is set to be equal to M_Step1 when it is decided to do so. At step S133, control is returned to step S131 if the end K has not yet been reached, so that counting the first motor step number M_Step1 will continue and so that scanning will continue up to the end K of scanning path 200a-1.

The step S140 of calculating the second motor step number M_Step2 comprises the substeps of S141, S142, S143, and S144. At step S141, scanner module 270 starts to scan in the other direction, that is, from end K of scanning path 200a-1 to vertical reference line 270a-1. At step S142, the second motor step number M_Step2 is counted, which constitutes the steps of carriage return motor 250e required to transport scanner module 270 from the end K of scanning path 200a-1 to vertical reference line 270a-1. At step S143, a decision is made as to whether vertical reference line 270a-1 was found during step S142. At step S144, control is returned to step S142 when the vertical reference line 270a-1 is not detected in step S143, in order to continue counting until vertical reference line 270a-1 is reached in order to be able to determine the number of motor steps needed to reach the vertical reference line 270a-1.

In FIG. 4B, the step S150 of correcting the bidirectional scanning distances if they are not equal comprises the steps of S151, S152, S153, and S154. At step S151, a decision is made as to whether reference value M_Ref and the second motor step number M_Step2 are equal. At step S152, the value of the number T is obtained where the number T equals the number M_Ref minus the number M_Step2. Also at step S152, a decision is made as to whether T is positive or negative if M_Ref and M_Step2 are not equal in step S151. At step S153, the value of T is added to the opposite scanning starting point K1 of vertical reference line 270a-1 in order to calculate the corrected opposite scanning starting point K2, if the number T is positive in step S152. At step S154, the value of T is subtracted from the opposite scanning start point K1 of vertical reference line 270a-1 in order to calculate the corrected opposite scanning starting point K2, if the number T is negative in step S152.

The present invention having such procedures as shown in FIGS. 4A and 4B shall now be described in more detail with reference to FIGS. 2, 3, 5, 6, and 7. Multifunctional machine 200 receives print data produced from personal computer 100 through communication with another personal computer, or sends image data or fax signal processed, First of all, the procedure of processing the print data applied from personal computer 100 will be stated.

When print data are produced from personal computer 100 according to a program, they are applied to central processing unit 230 via extended capabilities port (ECP) 210 of multifunctional machine 200. Here, extended capabilities port 210 is used for a parallel interface module for bidirectional communications.

Central processing unit 230 receiving the print data via extended capabilities port 210 processes them and applies them to print driver 240. Then, print driver 240 outputs a print head fire/enable control signal, a phase/position control signal for carriage return motor 250e, a print data handling control signal, and a line feed motor control signal. The control signals output from print driver 240 are accepted in printing section 250.

Printing section 250 carries print medium 200a with line feed roller 250b controlled by Line feed motor 250a according to the control signal applied. When print medium 200a is carried, printing starts according to the data applied through print head 250c controlled and moved by carriage return motor 250e and belt 250f. Here, print head 250c is guided by guide shaft 250d and moves across print medium 200a so that ink is sprayed according to the print control signal to form an image.

A demodulated digital signal, a fax or modem signal, which is applied to Modem/LIU 295 (modem/line interface unit) via PSTN (public switched telephone network) from the external devices through public switched telephone network and outputted hereat is matrix-transformed by rasterizer 290 according to the control of central processing unit 230. The matrix-transformed signal is sent to print driver 250 for printing, or to personal computer 100 via extended capabilities port 210 for storage.

During such operation, if a user intends to scan information-containing document 200a using multifunctional machine 200, the document is conveyed by line feed motor 250a and line feed roller 250b so that it is mounted on one side of print head 250c and carried to the initial scanning position of shuttle scanner module 270 which uses guide shaft 250d as its horizontal movement axis. Then, the document is scanned to read the information written thereon.

Figure 6:
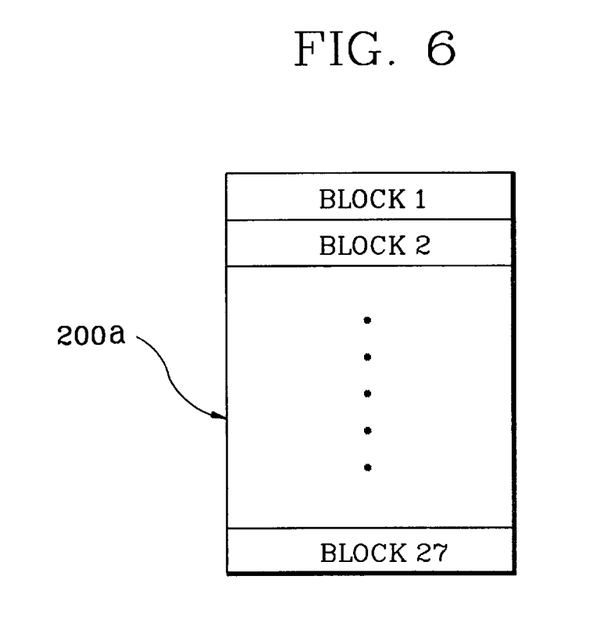
FIG. 6 is a diagram of the concept of the shuttle blocks of an A4 size document, according to the principles of the present invention.
Figure 7:
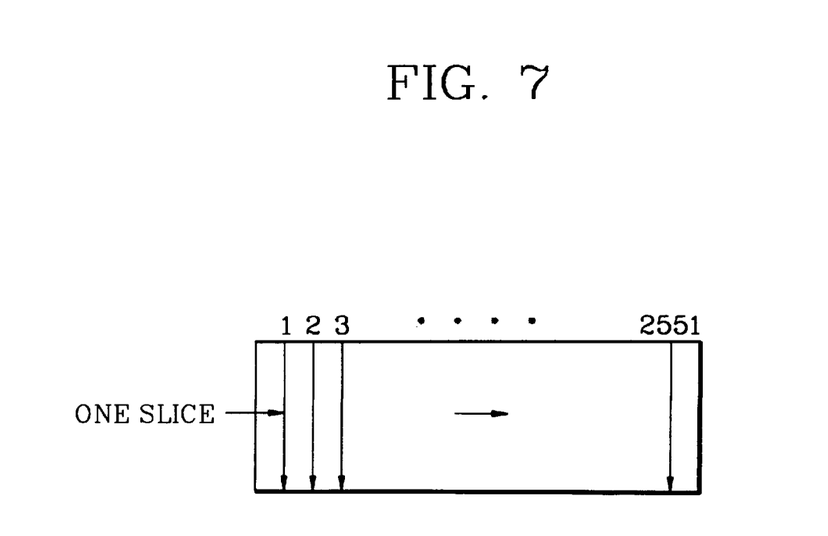
FIG. 7 is a diagram of a method of scanning the shuttle blocks of the A4 size document of FIG. 6, according to the principles of the present invention.

Turn now to FIG. 6, which illustrates a diagram of the concept of the shuttle blocks of an A4 size document, according to the principles of the present invention. According to the document scanning method, the document 200a is divided into 27 blocks, as in FIG. 6, if it is A4 size and the charge coupled device (CCD) is shuttle scanner module 270 with 128 dots. Turn now to FIG. 7, which illustrates a diagram of a method of scanning the shuttle blocks of the A4 size document of FIG. 6, according to the principles of the present invention. In scanning the respective blocks 1–27, they are divided into 2,551 slices, as shown in FIG. 7. Each of the vertical arrows indicates one slice.

The image data scanned with shuttle scanner module 270 go through shading, Gamma correction, dot per inch (DPI) transform, edge emphasis, and error diffusion. The corrected image data are matrix-transformed by rasterizer 290 and temporarily stored in image memory 280.

The bidirectional scanning is adopted to increase the scanning speed because the scanning time is elongated for those operations. However, the bidirectional scanning may cause the difference of scanning distances due to the mechanical characteristics. For the correction of the scanning distance difference caused, the distance is measured during bidirectional scanning in step S110.

Figure 5:
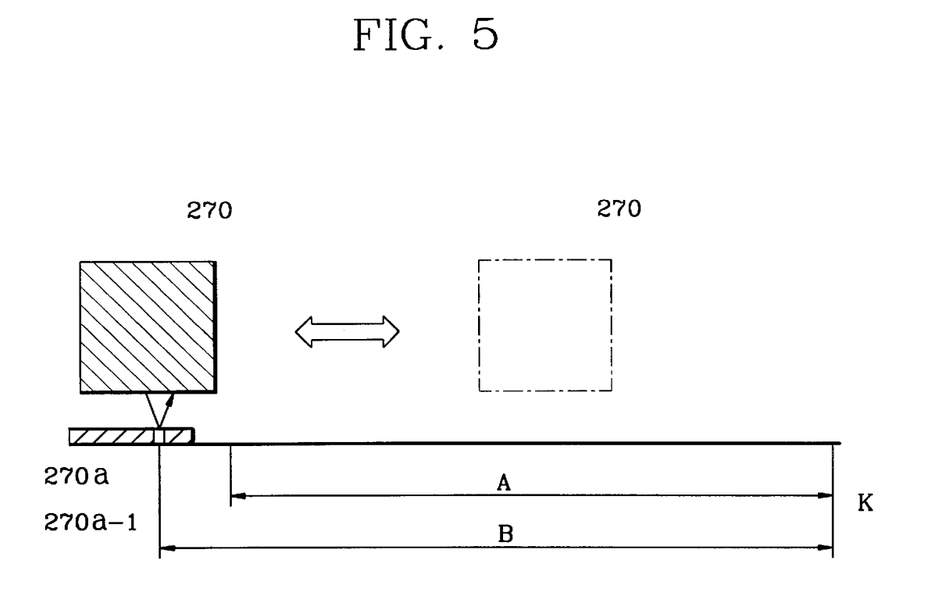
FIG. 5 is a diagram of the mechanism of the shuttle scanner of FIG. 3 for vertical alignment correction, according to the principles of the present invention.

Turn now to FIG. 5, which illustrates a diagram of the mechanism of the shuttle scanner of FIG. 3 for vertical alignment correction, according to the principles of the present invention. According to the bidirectional scanning, the end K of scanning area is scanned from vertical reference line 270a-1 formed on white pad 270a along scanning path 200a-1 of document 200a, as in FIG. 5. Scanning distance A is the maximum scanning distance of shuttle scanner module 270 when scanning a document, and scanning distance B represents the distance between vertical a reference line 270a-1 and the end K of scanning area.

When the bidirectional scanning starts as in FIG. 5, the first block of document 200a is to scanned in step S121. When this happens, shuttle scanner module 270 detects vertical reference line 270a-1 along scanning path 200a-1 of the first block in step S122. In other words, the module finds the position of vertical reference line 270a-1 formed on white pad 270a.

When the vertical reference line is detected by shuttle scanner module 270, it is decided in step S123 whether there is vertical reference line 270a-1 formed on white pad 270 at the scanning position. If no vertical reference line is detected, the step S124 is performed to return to step S122 to continuously search for vertical reference line 270a-1.

If vertical reference line 270a-1 is detected at step S125 as a result of step S123, the distance starting from vertical reference line 270a-1 to the end K of scanning path 200a-1 is measured in one direction. The shuttle scanner module moves from vertical reference line 270a-1 to the end K of scanning path 200a-1 by means of the rotation force of carriage return motor 250e.

The rotation of carriage return motor 250e corresponds to the distance of travel of shuttle scanner module 270. The rotation of carriage return motor 250e can be measured in motor steps. While the shuttle scanner module moves from the vertical reference line 270a-1 to the end K of the scanning path 200a-1, the motor steps of carriage return motor 250e are counted by central processing unit 230. The total number of motor steps required to move the shuttle scanner module from location 270a-1 to location K is denoted by M_Step1.

In step S132 it is decided whether the scanner module has reached the end K of the scanning area. In other words, it is decided whether the first motor step number M_Step1 corresponds to the end K. If the first motor step number M_Step1 does not correspond to the end K, then step S133 is performed to wait until shuttle scanner module 270 moves to the end K of scanning path 200a-1.

Conversely, if the first motor step number M_Step1 does correspond to the end K then reference value M_Ref is set to be equal to M_Step1 and scanning starts in step S141 in the opposite scanning direction from the end K of scanning path 200a-1 to vertical reference line 270a-1. In this situation, the distance from the end K of scanning path 200a-1 to vertical reference line 270a-1 is counted in step S142. This means that the second motor step number M_Step2 is counted in central processing unit 230, with the rotation number of carriage return motor 250e rotating in the opposite direction.

It is decided in step S143 whether vertical reference line 270a-1 is detected or not during the counting of second motor step number M_Step2. If not, step S144 is carried out to perform scanning in the opposite direction and to increment M_Step2 until vertical reference line 270a-1 formed on white pad 270a is detected.

If vertical reference line 270a-1 is detected during scanning, it is determined in step S151 whether reference value M_Ref and second motor step number M_Step2 are equal. That is, in this step it is decided whether the first motor steps counted while the shuttle scanner module 270 was transported from the vertical reference line 270a-1 to the end K of scanning path 200a-1 equals the second motor steps counted while the shuttle scanner module 270 was transported from the end K of scanning path 200a-1 to vertical reference line 270a-1. On some occasions the first motor steps will not be equal to the second motor steps, even though the distance between position 270a-1 and position K remains constant at all times. The inequality can be caused by imprecise, jerky movements of carriage return motor 250e or other mechanical characteristics possibly resulting from extensive usage.

If reference value M_Ref and second motor step number M_Step2 are equal according to the result obtained, shuttle scanner module 270 performs bidirectional scanning without correction in step S160. Conversely, if M_Step2 and M_Ref are not equal, it is determined in step S152 whether the number T where the second motor step number M_Step2 is subtracted from reference value M_Ref is positive or not. M_Step2 is subtracted from M_Ref to obtain value T. In step S152 a test is performed to determine if T is positive. In other words, it is decided whether the number where reference M_Ref, the movement distance in the initial scanning direction, and the second motor step number M_Step2, the opposite movement distance from the reference value's, are subtracted, is positive (M_Ref−M_Step2=T>0).

If the number T is positive, the opposite scanning start point K2 including the number T is calculated in step S153. The second motor step number M_Step2 is smaller than the reference value because the difference between them is positive. This indicates that the number of motor steps performed in scanning in the opposite scanning direction is less than the number of motor steps performed in the initial scanning direction. Therefore, the correction is performed in step S160 with the opposite scanning start point K2 obtained by adding the value of T to the opposite scanning start point K1.

If the number T is negative, the opposite scanning start point K2 including the number T is calculated in step S154. The second motor step number M_Step2 is greater than the reference value because the difference between them is negative. This indicates that the number of motor steps required in scanning in the opposite direction is larger than the number of motor steps required in the initial printing direction. Therefore, the correction is performed in step S160 with the opposite scanning start point K2 obtained by subtracting the value of T from the opposite scanning start point K1. Those procedures are controlled and carried out by central processing unit 230, and the result is stored in system memory 220 so that it is applied in the further actual bidirectional scanning.

Two exemplary scenarios pertaining to one embodiment of the present invention shall now be presented in detail, with specific values included. Note that, of course, other specific values can be applicable in variations of this embodiment and also in other embodiments. Refer to FIGS. 3 and 4.

Hereinafter is the first exemplary scenario pertaining to the embodiment of the present invention. First, the scanning of an original document 200a is performed in an initial scanning direction. The initial scanning direction is from reference line 270a-1 to end K of the scanning path 200a-1, as shown in FIG. 3. During the scanning in the initial scanning direction, a carriage return motor 250e is used to transport a scanner module 270 in the initial scanning direction. Also during the scanning in the initial scanning direction, a number of steps performed by the carriage return motor 250e is recorded. This number of steps shall be referred to as the number of first motor steps M_Step1. The number of first motor steps M_Step1 is incremented while the carriage return motor 250e transports the scanner module 270 from the reference line 270a-1 to the end K of the scanning path 200a-1.

When the scanner module 270 is located at the reference line 270a-1, prior to the beginning of the scanning in the initial scanning direction, M_Step1 is equal to zero. Then, at step S131 of FIG. 4A, the carriage return motor 250e begins to transport the scanner module 270 toward end K of scanning path 200a-1, and also the number of first motor steps M_Step 1 begins to be incremented.

At step S132 of FIG. 4A, the scanner module 270 has reached the end K of the scanning path 200a-1. The value of M_Step1 has been increased in a manner corresponding to the steps, or movement, of carriage return motor 250e. Now that the carriage return motor has transported the scanner module 270 all the way to the end K, M_Step1 is now equal to 3000. In other embodiments, M_Step1 may equal a number other than 3000. However, in this example, M_Step1 is equal to 3000.

At step S132 of FIG. 4A, the value of M_Step1 is 3000 and the reference value M_Ref is set to be equal to the value of M_Step1. Thus, M_Ref is now equal to 3000. Then, at step S141 of FIG. 4A, scanning is performed in the direction opposite to the initial scanning direction. Thus, scanning is performed in what shall be referred to as the opposite scanning direction. The "opposite scanning direction" is the scanning direction starting from the end K of the scanning path 200a-1 and ending at the reference line 270a-1.

During the scanning in the opposite scanning direction, carriage return motor 250e is used to transport a scanner module 270. Also during the scanning in the opposite scanning direction, a number of steps performed by the carriage return motor 250e is recorded. This number of steps shall be referred to as the number of second motor steps M_Step2. The number of second motor steps M_Step2 is incremented while the carriage return motor 250e transports the scanner module 270 from the end K of scanning path 200a-1 to the reference line 270a-1.

Immediately after step S132 and immediately before step S141, the scanner module 270 is located at the end K of the scanning path 200a-1, the scanning in the opposite scanning direction has not yet started, and the value of M_Step2 is equal to zero. Then, at step S141, the carriage return motor 250e begins to transport the scanner module 270 toward the reference line 270a-1, and also the number of second motor steps M_Step2 begins to be incremented.

At step S143, the scanner module 270 reaches the reference line 270a-1. At this time, M_Step2 has been incremented in a manner corresponding to the steps of the carriage return motor 250e. M_Step2 is now equal to 2999. Thus, in this example, the number of steps required for the carriage return motor 250e to transport the scanner module 270 from the reference line 270a-1 to end K of the scanning path 200a-1 is 3000 (M_Step1) while the number of steps required for the carriage return motor 250e to transport the scanner module 270 from the end K of the scanning path 200a-1 to the reference line 270a-1 is 2999 (M_Step2). The value of the first motor steps is referred to as M_Step1 and the value of the second motor steps is referred to as M_Step2.

The distance that the scanner module 270 traveled in the initial scanning direction is identical to the distance that the scanner module 270 traveled in the opposite scanning direction. In this embodiment that distance is equal to 16.0 inches. The fact that M_Step1 is not equal to M_Step2 can be due to mechanical characteristics of the carriage return motor 250e and of the associated mechanical components. The amount of lubrication on the components and the amount of debris or contamination on the components can also be responsible for the fact that M_Step1 is not equal to M_Step2. Such mechanical components tend to change slightly after extensive use. Thus, the carriage return motor 250e may operate in a slightly jerky and unsmooth operating manner when transporting the scanner module 270 in the opposite scanning direction, while that same carriage return motor 250e operates in a smooth operating manner when transporting the scanner module 270 in the initial scanning direction.

M_Step1 and M_Ref are both equal to 3000 and M_Step2 is equal to 2999. At step S151, a test is performed to determine if M_Step2 is equal to M_Ref. Since M_Step2 is not equal to M_Ref, step S152 is performed next. At step S152, the value of M_Step2 is subtracted from the value of M_Ref, to obtain the value of T. In other words, M_Ref minus M_Step2 equals T. In this example, T is equal to 1 because 3000 minus 2999 is equal to 1. Then a test is performed to determine if T is a positive value or a negative value.

Note that in steps S153 and S154 a value of K1 and a value of K2 are involved in calculations. K1 represents the uncorrected, standard starting location for the scanner module 270 near the end K of the scanning path 200a-1, when the scanner module 270 is about to begin scanning in the opposite scanning direction. K2 represents the corrected starting location for the scanner module 270 near the end K of the scanning path 200a-1, when the scanner module 270 is about to begin scanning in the opposite scanning direction.

T is a positive value which causes step S153 to be performed next. At step S153, the value of T is added to the value of K1 to obtain the value of K2. The value of K1 is zero, which is the same as the starting value for M_Step2. Thus, in this example, the value of K2 is 1. Next, at step S160, bidirectional scanning will start. During the bidirectional scanning, the scanning in the initial scanning direction will require 3000 motor steps and the scanning in the opposite scanning direction will also require 3000 motor steps. The scanning in the initial scanning direction will require 3000 steps, since the numbering of the steps will start at the value of 0 when the scanner module 270 is located at the reference line 270*a*-1 and the numbering of the steps will end at the value of 3000 when the scanner module 270 is located at the end K of the scanning path 200*a*-1. Due to the corrected alignment of the present invention, the scanning in the opposite scanning direction will also require 3000 motor steps, since the numbering of the steps will start at a position corresponding to the value of K2 near the end K of the scanning path 200*a*-1 and the numbering of the steps will end at the value of 3000 when the scanner module 270 is located at the reference line 270*a*-1. The standard starting location K1 is not used for the scanner module 270 when the scanning is about to begin in the opposite scanning direction. Instead, a corrected starting location K2 is used for the scanner module 270 when the scanning is about to begin in the opposite scanning direction. Due to step S153, when referring to FIG. 3, the starting position of the scanner module 270 near the end K of scanning path 200*a*-1 is moved to the right the equivalent of 1 motor step. At step S160, bidirectional scanning starts. During the bidirectional scanning, the scanner module 270 is located at the reference line 270*a*-1 when starting the scan in the initial scanning direction and the scanner module 270 is located at position K2, near the end K of the scanning path 200*a*-1, when starting the scan in the opposite scanning direction. Position K2 corresponds to initial starting point K1 which has been corrected by the amount T.

Hereinafter is the second exemplary scenario pertaining to the embodiment of the present invention. Consider now a slightly different scenario which may occur using the aforementioned embodiment of the present invention. Here, in the second exemplary scenario, M_Step2 is equal to 3002, M_Step1 is equal to 3000, and M_Ref is equal to 3000. At step S151, it is determined that M_Step2 is not equal to M_Ref. Then at step S152, 3000 minus 3002 is determined to be equal to −2. Thus, T is equal to −2. Here, T is a negative value which causes step S154 to be performed next. At step S154, the value of T is subtracted from the value of K1 to obtain the value of K2. The value of K1 is zero, which is the same as the starting value for M_Step2. Thus, in this example, the value of K2 is −2. Next, at step S160, bidirectional scanning will start. During the bidirectional scanning, the scanning in the initial scanning direction will require 3000 motor steps and the scanning in the opposite scanning direction will also require 3000 motor steps. The scanning in the initial scanning direction will require 3000 steps, since the numbering of the steps will start at the value of 0 when the scanner module 270 is located at the reference line 270*a*-1 and the numbering of the steps will end at the value of 3000 when the scanner module 270 is located at the end K of the scanning path 200*a*-1. Due to the corrected alignment of the present invention, the scanning in the opposite scanning direction will also require 3000 motor steps, since the numbering of the steps will start at a position corresponding to the value of K2 near the end K of the scanning path 200*a*-1 and the numbering of the steps will end at the value of 3000 when the scanner module 270 is located at the reference line 270*a*-1. The standard starting location K1 is not used for the scanner module 270 when the scanning is about to begin in the opposite scanning direction. Instead, a corrected starting location K2 is used for the scanner module 270 when the scanning is about to begin in the opposite scanning direction. Due to step S154, when referring to FIG. 3, the starting position of the scanner module 270 near the end K of scanning path 200*a*-1 is moved to the left the equivalent of 2 motor steps. At step S160, bidirectional scanning starts. During the bidirectional scanning, the scanner module 270 is located at the reference line 270*a*-1 when starting the scan in the initial scanning direction and the scanner module 270 is located at position K2, near the end K of the scanning path 200*a*-1, when starting the scan in the opposite scanning direction. Position K2 corresponds to initial starting point K1 which has been corrected by the amount T.

Note that there are alternative ways in which the value of M_Ref can be set. The value of M_Ref is set in step S132 of FIG. 4A as previously described. However, the value of M_Ref could be set prior to step S131 of FIG. 4A. Thus, step S132 would merely be a comparison to determine if M_Step1 was equal to M_Ref.

As described above, the present invention previously measures the difference in scanning prior to bidirectional scanning in a multifunctional machine, and compensates for the difference in the actual scanning to adjust vertical alignment. For this reason, the present invention is able to increase the scanning speed without image quality decreasing. Further, the vertical alignment is maintained through automatic correction performed prior to every bidirectional scanning, always keeping the optimal status during scanning.

The foregoing paragraphs describe the details of a vertical alignment correction apparatus and method. More particularly, the foregoing paragraphs describe the details of a vertical alignment correction apparatus and method for setting a reference line in a scanning white pad for white reference during scanning to thereby correct the distance difference caused during bidirectional to scanning in a multifunctional machine.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiment disclosed as the best mode contemplated for carrying out the present invention, but that the present invention includes all embodiments falling within the scope of the appended claims.

What is claimed is:

1. An alignment correction apparatus for a bidirectional scanner device, comprising:

an optical reading unit reading image data from a surface of an original document when said optical reading unit is being transported along a first path of conveyance in a first direction from a first scan start point in a first scan area across the surface of the original document to a second scan area, and reading image data from the original document when said optical unit is being transported along a second path of conveyance in a second direction from a second scan start point in said second scan area across the surface of the original document to said first scan area, the second direction being opposite to the first direction, said optical reading unit detecting a reference line at said first scan area;

a carriage return motor performing a first plurality of rotation steps to transport said optical reading unit in the first direction from said first scan start point in said first scan area to said second scan area, and performing a second plurality of rotation steps to transport said optical reading unit in the second direction from said second scan start point in said second scan area to said first scan area;

a control unit reading an alignment correction routine, detecting said first and second pluralities of rotation steps of said carriage return motor;

when said first and second pluralities of rotation steps are not equal, said control unit outputting an alignment correction signal corresponding to a difference among said first and second pluralities of rotation steps and in accordance with the alignment correction routine; and a motor controller receiving said alignment correction signal from said control unit, and controlling said second scan start point in said second scan area according to said alignment correction signal to equalize said first and second pluralities of rotation steps, said first and second pluralities of rotation steps being equalized prior to said optical reading unit reading the image data from the surface of the original document;

said controlling of said second scan start point comprising:

determining when said first reference value is equal to said second reference value;

when said first reference value is not equal to said second reference value, determining a third reference value by subtracting said second reference value from said first reference value; and when said third reference value is within a first set of parameters, modifying said second scan start point by offsetting said second scan start point to a first side of said second scan area by an amount corresponding to said third reference value.

2. The apparatus of claim 1, said control unit corresponding to a microcomputer.

3. The apparatus of claim 1, further comprising a reference unit bearing the reference line located at said first scan area.

4. The apparatus of claim 3, said control unit detecting when said optical reading unit is located at said reference unit.

5. The apparatus of claim 3, said reference unit corresponding to a white pad having the reference line formed thereon.

6. An alignment correction method for a bidirectional scanner device, the method comprising the steps of:

detecting a reference unit located on said scanner device in a first scan area;

when said reference unit is detected, transporting an optical reading unit along a first path of conveyance in a first direction from a first scan start point in said first scan area across a surface of an original document to a second scan area, and obtaining a first reference value, said optical reading unit being transported by a carriage return motor;

when said first reference value is obtained, transporting said optical reading unit along a second path of conveyance in a second direction from a second scan start point in said second scan area across the surface of the original document to said first scan area, and obtaining a second reference value;

when said first reference value is not equal to said second reference value, modifying said second scan start point in said second scan area to ensure correct alignment of image data to be read from the original document, said modifying of said second scan start point being performed prior to said optical reading unit reading image data from the surface of the original document;

said modifying step further comprising the steps of:

comparing said first reference value and said second reference value;

determining when said first reference value is equal to said second reference value;

when said first reference value is not equal to said second reference value, determining a third reference value by subtracting said second reference value from said first reference value; and when said third reference value is within a first set of parameters, modifying said second scan start point by offsetting said second scan start point to a first side of said second scan area by an amount corresponding to said third reference value.

7. The method of claim 6, when said first reference value is not equal to said second reference value, said optical reading unit reading the image data from the surface of the original document after said modifying is performed, said optical reading unit reading the image data from the surface of the original document while said optical reading unit is being transported in said first direction and in said second direction.

8. The method of claim 6, said first direction being substantially opposite to said second direction.

9. The method of claim 6, said detecting step being performed by said optical reading unit.

10. The method of claim 6, said detecting step further comprising the steps of:

transporting said optical reading unit to said first scan area adjacent to a first segment of the image data of the original document, and reading a plurality of data with said optical reading unit;

attempting to identify said reference unit adjacent to said first segment of the image data of the original document; and determining whether said reference unit is identified in said attempting step.

11. The method of claim 10, said determining step being performed by a control unit.

12. The method of claim 10, further comprising the step of repeating said attempting step when said determining step results in a determination that said reference unit was not identified in said attempting step.

13. The method of claim 10, said reference unit being located at said first scan start point in said first scan area.

14. The method of claim 6, said reference unit corresponding to a white pad having a line formed thereon.

15. The method of claim 6, said first reference value corresponding to a first plurality of rotation steps performed by said carriage return motor when said carriage return motor transports said optical reading unit along said first path of conveyance in said first direction.

16. The method of claim 15, said second reference value corresponding to a second plurality of rotation steps performed by said carriage return motor when said carriage return motor transports said optical reading unit along said second path of conveyance in said second direction.

17. The method of claim 16, said image data being disposed between said first and second scan areas, said first path of conveyance having an ending location at said second scan area, and said second path of conveyance having a starting location at said second scan area.

18. The method of claim 17, said modifying step further comprising the step of:
when said third reference value is not within said first set of parameters, modifying said second scan start point by offsetting said second scan start point to a second side of said second scan area by an amount corresponding to said third reference value, said second side being different than said first side.

19. The method of claim 17, further comprising the step of counting said first plurality of rotation steps starting from said reference unit and ending at said second scan area.

20. The method of claim 19, further comprising the step of counting said second plurality of rotation steps starting from said second scan area and ending at said reference unit.

21. The method of claim 6, said modifying step further comprising the step of:
when said third reference value is not within said first set of parameters, modifying said second scan start point by offsetting said second scan start point to a second side of said second scan area by an amount corresponding to said third reference value, said second side being opposite to said first side.

22. The method of claim 21, said third reference value being within a first set of parameters when said third reference value is less than zero.

23. A bidirectional scanning apparatus reading data, comprising:
a microcomputer reading an alignment correction routine, detecting scanning distances during bidirectional scanning using a reference line, and modifying a correction control signal output to correct a difference among said scanning distances according to a result of the detecting and according to the alignment correction routine when the difference among said scanning distances occurs, said bidirectional scanning corresponding to a first scan in a first direction from a first scan start point in a first scan area and a second scan in a second direction from a second scan start point in a second scan area;
a motor controller receiving the correction control signal output from said microcomputer; and
a carriage return motor having a rotation number controller by said motor controller according to the correction control signal output from said microcomputer, said modifying of said correction control signal comprising:
comparing a first reference value and a second reference value;
determining when said first reference value is equal to said second reference value;
when said first reference value is not equal to said second reference value, determining a third value by subtracting said second reference value from said first value;
when said third reference value is within a first set of parameters, modifying said second scan start point by offsetting said second scan start point to a first side of said second scan area by an amount corresponding to said third reference value; and
when said third reference value is not within said first set of parameters, modifying said second scan start point by offsetting, said second scan start point to a second side of said second scan area by an amount corresponding to said third reference value, said second side being opposite to said first side.

24. The apparatus of claim 23, the reference line being formed on a white pad.

25. The apparatus of claim 23, said motor controller receiving the correction control signal output when a routine correcting scanning differences is executed.

26. An alignment correction method for a bidirectional scanner, the method comprising the steps of:
scanning and recognizing a reference line adjacent to a first block of image data on a document;
when the reference line is recognized, performing a first scan by scanning in a first direction away from the reference line and toward an end of a scanning path and calculating a distance reference value, said first scan corresponding to scanning in said first direction from a first scan start point in a first scan area;
when the distance reference value is calculated, performing a second scan by scanning in a second direction substantially opposite to said first direction to count a second-direction motor step number, said second direction being away from the end of the scanning path and toward the reference line, said second scan corresponding to scanning in said second direction from a second scan start point in a second scan area;
comparing the distance reference value and the second-direction motor step number;
when the distance reference value and the second-direction motor step number are not equal, correcting the distance reference value and the second-direction motor step number to make them equal so that bidirectional scanning distances become equal;
said correcting of the distance reference value and the second-direction motor step number further comprising:
when the distance reference value is not equal to the second-direction motor step number, determining a special reference value by subtracting the second-direction motor step number from the distance reference value; and
when said special reference value is within a first set of parameters, modifying said second scan start point by offsetting said second scan start point to a first side of said second scan area by an amount corresponding to said special reference value.

27. The method of claim 26, said step of scanning and recognizing a reference line comprising the substeps of:
initiating a scan of the first block of image data;
when said initiating of said scan occurs, checking for a detection of the reference line along a scanning path of the first block of the image data; and
determining whether the reference line is present or not present.

28. The method of claim 27, further comprising the step of:
when said determining step results in a determination that the reference line is not present, repeating said checking step in order to find the reference line.

29. The method of claim 26, said step of scanning in the first direction comprising the substeps of:
counting a first-direction motor step number to begin a measurement of a distance from the reference line to an end of a scanning path in said first direction; and
deciding whether the first-direction motor step number is obtained or is not obtained in said counting step, said first-direction motor step number corresponding to the reference value.

30. The method of claim 29, further comprising the step of:
when said deciding step results in a decision that the reference value is not obtained, repeating said step of counting the first-direction motor step number in order to scan up to the end of the scanning path in said first direction.

31. The method of claim 26, said step of scanning in said second direction comprising the substeps of:

scanning from the end of the scanning path to the reference line in said second direction;

counting the second-direction motor step number, the second-direction motor step number corresponding to a distance from the end of the scanning path to the reference line; and deciding whether said scanning in said second direction has detected the reference line or has not detected the reference line, said scanning in said second direction corresponding to the second-direction motor step number.

32. The method of claim 31, further comprising the step of:

when said deciding step results in a decision that said scanning in said second direction has not detected the reference line, repeating said step of counting the second-direction motor step number in order to scan up to the reference line in said second direction.

33. The method of claim 26, said correcting of the distance reference value and the second-direction motor step number further comprising:

when said special reference value is not within said first set of parameters, modifying said second scan start point by offsetting said second scan start point to a second side of said second scan area by an amount corresponding to said special reference value, said second side being opposite to said first side.

* * * * *